US 8,820,820 B2

(12) United States Patent
De Luca

(10) Patent No.: US 8,820,820 B2
(45) Date of Patent: *Sep. 2, 2014

(54) REAR MOTOR VEHICLE FLOOR MODULE

(75) Inventor: Fabian De Luca, Luedenscheid (DE)

(73) Assignee: GM Global Technology Operations LLC, Detroit, MI (US)

(*) Notice: Subject to any disclaimer, the term of this patent is extended or adjusted under 35 U.S.C. 154(b) by 231 days.

This patent is subject to a terminal disclaimer.

(21) Appl. No.: 13/326,498

(22) Filed: Dec. 15, 2011

(65) Prior Publication Data

US 2012/0153673 A1 Jun. 21, 2012

(30) Foreign Application Priority Data

Dec. 16, 2010 (DE) .................. 10 2010 054 685

(51) Int. Cl.
B62D 25/20 (2006.01)
(52) U.S. Cl.
USPC .............................. 296/193.07; 296/193.04
(58) Field of Classification Search
USPC ............... 296/181.2, 187.08, 187.11, 193.04, 296/193.07, 193.08, 203.04
See application file for complete search history.

(56) References Cited

U.S. PATENT DOCUMENTS

| 4,531,761 | A | 7/1985 | von Sivers |
| 5,310,212 | A | 5/1994 | Uno et al. |
| 5,364,128 | A | 11/1994 | Ide |
| 5,567,005 | A | 10/1996 | Kosuge et al. |
| 6,540,286 | B2 | 4/2003 | Takemoto et al. |
| 6,666,501 | B1 | 12/2003 | Logan et al. |
| 6,729,682 | B2 | 5/2004 | Delavalle et al. |
| 6,793,261 | B2 | 9/2004 | McLeod et al. |
| 7,111,900 | B2 | 9/2006 | Chernoff et al. |
| 7,338,115 | B2 | 3/2008 | Rocheblave et al. |
| 7,347,475 | B2 | 3/2008 | Ikemoto et al. |
| 8,210,301 | B2 | 7/2012 | Hashimoto et al. |
| 2001/0028179 | A1 | 10/2001 | Takemoto et al. |
| 2006/0197361 | A1 | 9/2006 | Ito et al. |
| 2007/0138836 | A1 | 6/2007 | Harney et al. |
| 2008/0277968 | A1 | 11/2008 | Egawa et al. |
| 2009/0058065 | A1 | 3/2009 | Park |
| 2009/0102238 | A1 | 4/2009 | Gomi |

FOREIGN PATENT DOCUMENTS

| DE | 10058016 A1 | 5/2002 |
| DE | 102004007037 A1 | 9/2005 |
| DE | 102005017249 A1 | 5/2006 |
| DE | 60115518 T2 | 7/2006 |
| DE | 102007047037 A1 | 4/2009 |

(Continued)

OTHER PUBLICATIONS

USPTO Final Office Action for U.S. Appl. No. 13/326,512 dated Apr. 18, 2013.

(Continued)

Primary Examiner — Jason S Morrow
Assistant Examiner — E Turner Hicks
(74) Attorney, Agent, or Firm — Ingrassia Fisher & Lorenz, P.C.

(57) ABSTRACT

A rear floor module is arranged between two rear frame rails of a vehicle body running essentially in the longitudinal direction of the vehicle. The floor module includes, but is not limited to a floor tray essentially extending flatly between the frame rails and at least one integrated cross member, which is configured for separately connection with the frame rails for transmitting mechanical forces, and which is provided with a connecting structure to which at least one component of a vehicle chassis can be secured.

13 Claims, 5 Drawing Sheets

(56) References Cited

FOREIGN PATENT DOCUMENTS

| EP | 0390752 A1 | 10/1990 |
|---|---|---|
| EP | 1612127 A2 | 1/2006 |
| EP | 1820716 A1 | 8/2007 |
| EP | 2141064 A1 | 1/2010 |
| GB | 2080211 A | 2/1982 |
| GB | 2287679 A | 9/1995 |
| JP | 2003291856 A | 10/2003 |

OTHER PUBLICATIONS

German Patent Office, German Search Report for Application No. 102010054694.1, dated Jun. 14, 2011.
German Patent Office, German Search Report for Application No. 102010054685.2, dated Jun. 14, 2011.
German Patent Office, German Search Report for Application No. 102010054693.3, dated Jun. 1, 2011.
USPTO, US Non-Final Office Action issued in U.S. Appl. No 13/326,782, mailed Dec. 21, 2012.
Response to Non-final Office Action for U.S. Appl. No. 13/326,782, dated Mar. 5, 2013.
USPTO, US Non-final Office Action issued in U.S. Appl. No. 13/326,512, mailed Nov. 9, 2012.
British Patent Office, British Search Report for Application No. GB1118963.6, dated Feb. 23, 2012.
British Patent Office, British Search Report for Application No. GB1118967.7, dated Feb. 23, 2012.
British Patent Office, British Search Report for Application No. GB1118966.9, dated Feb. 29, 2012.
Non-final Office Action mailed Mar. 28, 2014 in U.S. Appl. No. 13/326,782.

REAR MOTOR VEHICLE FLOOR MODULE

CROSS-REFERENCE TO RELATED APPLICATION

This application claims priority to German Patent Application No. 102010054685.2, filed Dec. 16, 2010, which is incorporated herein by reference in its entirety.

TECHNICAL AREA

The technical field relates to a rear floor module arranged between two frame rails of a vehicle body running essentially in the longitudinal direction of the vehicle.

BACKGROUND

Frame rails of a motor vehicle body are typically connected with each other by one or more cross members in the rear of the body, to form a closed rear or back frame. The position of the cross member varies when viewed in the longitudinal direction of the vehicle, and adjusted to the respective motor vehicle configuration or the motor vehicle type. For example, depending on whether the motor vehicle is to be equipped with a trailer/towing device or an extendible load carrier, this may require that corresponding changes be made to the design of the vehicle body, in particular with respect to the position of the cross member. This holds true in equal measure for different vehicle types, for example for sedans or caravans or station wagons or limousines.

In addition, new drive concepts for vehicles, in particular for hybrids or fuel-cell powered vehicles, require a modified or variably adjustable partitioning of the installation space for accommodating energy storage modules or fuel containers. In particular for hybrids or purely electric-powered vehicles, it is desirable to incorporate the batteries they require as deeply as possible in the vehicle, to improve the center of gravity of the vehicle. For example, DE 10 2007 047 037 A1 discloses a motor vehicle body with two opposing rear side frame rails, wherein at least one auxiliary frame and/or one or more cross members can be allocated to the rear side frame rails and secured thereto.

The side frame rails, the auxiliary frame or the cross members are here already provided in advance with a number of joints, which are designed and arranged in such a way that one or more correspondingly adjusted aggregates and/or add-on parts can be modularly secured to the side frame rails in proximity to the joints, depending on the equipment currently desired for the motor vehicle rear frame. It is complicated and costly from the standpoint of production and assembly to have available a plurality of different body variants, e.g., in which sheet metal parts for the body must be separately fabricated and conceived for each type of vehicle. In addition to the body structure, motor vehicles exhibit a chassis, which is fabricated parallel to the body in the process of manufacturing the motor vehicle, and joined in its entirety with the preconfigured body in a joining process generally referred to as a marriage. In particular, in the rear area, the chassis exhibits a wheel suspension with lateral, pivoted axle journals, wherein the left and right axle journals are typically coupled by means of a Watt linkage.

In known vehicle configurations, the Watt linkage is mounted on load-bearing structural components of the body, or pivoted thereto. In this way, a Watt linkage coupling is established in the area of a cross member structure that joins the two frame rails of a motor vehicle body in the transverse direction (y) of the vehicle. A plurality of individual assembly steps involving the use of several components is required precisely for attaching and assembling a Watt linkage to the body.

Therefore, at least one object is to provide a rear cross member of a motor vehicle body that is improved in terms of weight and installation variability, and distinguished by both lower production and assembly costs and a reduced weight. At least another object is to create a rear vehicle platform-independent rear cross member structure that can be individually adjusted to different vehicle types and equipment, and is easy to assemble. In addition, the process of joining the motor vehicle body and chassis is to be simplified and optimized, while economizing on assembly steps and reducing the number of components required for assembly. In addition, other objects, desirable features, and characteristics will become apparent from the subsequent summary and detailed description, and the appended claims, taken in conjunction with the accompanying drawings and this background.

SUMMARY

This object is achieved with a rear floor module, with a motor vehicle body, as well as with a motor vehicle. The rear floor module is designed for a motor vehicle body, and meant to arrange between two rear frame rails of the vehicle body running essentially in the longitudinal direction of the vehicle. The floor module here exhibits a floor tray essentially running flatly between the frame rails of the vehicle body, as well as at least one integrated cross member. The cross member integrated in the floor tray can here be separately connected with the frame rails for transmitting mechanical forces, and further exhibits a connecting structure to which at least one component of a vehicle chassis can be directly secured. Instead of a separate Watt linkage coupling to the motor vehicle body to be realized in several assembly steps and using several attachment components, the Watt linkage can be indirectly coupled to a cross member integrated in a rear floor module.

The floor module can here be connected with a Watt linkage in advance, in particular to create a preconfigured installation unit comprised of the floor module and Watt linkage, which can also be arranged on the vehicle only following the marriage of the body and chassis. The floor module is here preferably designed as a structurally reinforced plastic component, if necessary as a hybrid component with structurally reinforcing metal inserts. The floor module is provided for connection with the load-bearing structural components of the motor vehicle or its body only when the vehicle is in the final assembly stages. Because the rear floor module is provided, the assembly process can be simplified by reducing the number of parts.

In addition, the error proneness of the assembly process can be reduced. This is because, by mounting the cross member on the frame rails, the floor tray also achieves the final assembly position envisaged for it and vice versa. Differently configured floor modules that each exhibit one or more cross members varyingly positioned in the longitudinal direction (x) of the vehicle can also always be secured to the frame rail in largely an identical manner. Therefore, no redundant joints for the floor module or cross member need to be provided on the body, in particular on the frame rail.

A first development provides that at least sections of the floor tray and/or cross member be made out of plastic. The floor tray and/or cross member preferably is essentially of plastic. Using a plastic material for the floor tray and/or cross member permits a decrease in overall vehicle weight, and can to this extent help cut fuel consumption by the vehicle. The configuration as a plastic module also enables a flexible adjustment of the position of the cross member within the floor module and/or relative to the frame rails. As a whole, this makes it possible to provide a platform and vehicle type-independent assembly concept. The respective floor module must be adjusted to varyingly partitioned installation spaces in the vehicle, and correspondingly varying positions of the cross member, in particular with respect to the longitudinal direction of the vehicle.

A further development provides that the floor tray and cross member is designed as a single piece. The floor tray and cross member are preferably fabricated as an injection molded plastic component. Depending on the existing installation situation, a plurality of differently configured floor modules individually tailored to a respective vehicle type or manufacturing platform can here be prefabricated, for example in a plastic injection molding process. For example, the ranges of different floor modules obtainable as a result can vary with respect to the position of its/their cross members, to account for the in part differing installation circumstances for the respective vehicle or vehicle type.

It further proves advantageous for at least one lateral boundary edge of the floor tray to exhibit an attachment profile adjusted to the geometry of the allocated frame rail for attachment to at least one of the frame rails. For example, an attachment profile projecting from the lateral edge of the floor tray can be provided, e.g., which comes to abut the top side, bottom side or interior lateral wall of the allocated frame rail, and can there be joined with the latter.

In relation to the vertical direction (z) of the vehicle, the preferably structurally reinforced cross member extends above and/or below the lateral attachment profile of the floor tray. It can further lie within the height range of the floor tray and/or its attachment profile. In particular, given an embodiment in which the cross member comes to lie under the floor tray or under or adjacent to a lateral attachment profile, the cross member can be connected with a coupling structure for receiving the chassis components that naturally come to lie under and/or overlap the floor module.

Because the end sections of the cross member integrated in the floor module that lie in the transverse direction of the vehicle come to lie under the frame rails, the frame rails and floor module side cross member can exhibit a comparably large, reciprocal coupling area extending over nearly the entire width of the cross member and/or frame rail, which enables as torsion-resistant and rigid a force-transmitting connection as possible between the frame rails and cross members. In this regard, the rear floor module performs a dual function. Its floor tray fills out the gap between the rear side frame rails extending essentially in the longitudinal direction of the vehicle. By contrast, the cross member integrated into the floor module acts as a structurally reinforcing component, but given the one-piece configuration of the floor tray and cross member, is preferably attached together with the floor module to the vehicle body, preferably to its rear frame rails.

In another embodiment, the cross member exhibits a connecting structure for directly linking at least one chassis component to the cross member, and hence to the floor module. As a result, the preferably structurally reinforced cross member can also act as a receptacle or linking point for the components of a chassis to be secured to the body. Instead of an individual linking structure to be separately joined with the frame rails of the body, the former can in the present embodiment be directly integrated in the cross member preferably designed as an injection molded plastic component.

In addition, it may prove advantageous to provide a depression for accommodating the at least one chassis component in a bottom side of the floor module, roughly bordering the cross member in the longitudinal direction of the vehicle. Because the floor module is preferably designed as an injection-molded component, it can exhibit nearly any geometric contour without any additional outlay in terms of structure or assembly, and hence be adjusted to the later location and position of additional vehicle components, in particular chassis components.

In a further development of the above, it can also prove especially advantageous that the cross member be designed to receive or mount a Watt linkage of the chassis. This advantageously eliminates the need for an individual or separate linking structure on the body-side rear frame rails for receiving a Watt linkage. When a final assembly position is reached, the Watt linkage preferably comes to lie in the depression of the floor module adjacent to the cross member. Because the floor module receptacle provided for the Watt linkage also directly borders the cross member, a structurally reinforcing element recessed or embedded in the cross member material can exhibit a metal sleeve or bushing for receiving the Watt linkage bearing. It here also proves advantageous for the sleeve or the connecting structure to be provided on the cross member to extend essentially in the vertical direction (z) of the vehicle, so that the Watt linkage can be screwed to or otherwise connected with the cross member during the marriage of the body and chassis in the longitudinal or vertical direction of the vehicle. However, it is also conceivable to separately arrange or secure the preconfigured Watt linkage on the floor module already before the marriage of body and chassis, and only functionally connect the Watt linkage with the chassis during installation of the floor module.

In another embodiment, the cross member integrates a sleeve aligned essentially in the longitudinal direction (x) of the vehicle or vertical direction (z) of the vehicle, which is used to accommodate a bearing or bearing bolt of the Watt linkage of the chassis. The alignment of the sleeve here corresponds either to the alignment of the Watt linkage bearing and/or the direction of assembly or attachment envisaged by the process for manufacturing the motor vehicle. The floor module essentially designed as an injection molded plastic component can be used to adjust the configuration of the cross member linking area of the floor module to prescribed installation conditions in a largely variable and nearly cost-neutral manner.

A further development of the above can also provide that that a receptacle that comes to lie flush with the carrier-side sleeve or reinforcing structure be incorporated in a cheek adjacent to a depression of the floor module in a longitudinal direction. As already the case with respect to the carrier-side sleeve, the receptacle is used to link or mount the bearing of the Watt linkage. If an installation in the vertical direction of the vehicle is to be strictly observed, it can also be provided as a departure from the above that a linking structure already be furnished in the area of the Watt linkage bearing, on the chassis side, as it were, which can be mounted, preferably screwed, in the z-direction into another linking structure corresponding thereto, for example on the cross member and/or spaced apart from the latter in a longitudinal or transverse direction of the vehicle.

In another embodiment, the end sections of the cross member lying in the transverse direction of the vehicle project laterally from the floor tray of the floor module, and its projecting end sections exhibit a supporting surface that is provided or to be provided with an attachment means, with which the cross member can be supported from below by the respectively allocated frame rail of the body once it has reached its final assembly position. The supporting surface advantageously exhibits a shape corresponding to the outer contour of the allocated frame rail, thereby allowing the supporting surface and bottom side of the allocated frame rail to be mutually fixed about each other over as large an area as possible, roughly on the entire surface. The frame rail and/or supporting surface can further be provided with individual attachment means, like screws, rivets, screw holes, and/or welding nuts, to structurally connect the floor module preferably designed as an injection molded plastic component with the frame rails fabricated out of sheet metal shells.

In the case of a plastic floor module, the connection segments, in particular, those for receiving screws can be provided with metal sleeves recessed or embedded in the plastic material or local metal inserts to impart sufficient stability to the plastic component, in particular in its connecting regions bordering other components of the body.

In another embodiment, a transverse web running between the opposing attachment profiles on the edge side extends on the top side of the floor module at roughly the height of the at least one cross member in relation to the longitudinal direction (x) of the vehicle. This transverse web is able to impart additional stiffness to the floor module. In particular, the floor module in the transverse web area can be provided with a structurally reinforcing metal insert, so as to impart an inherently enhanced strength and structural rigidity to not just the cross member, but also to the tray-shaped floor module. The transverse web can also be regarded as an upwardly directed elongation of the cross member that passes through the floor module.

It can generally be envisaged in further embodiments of the floor module that at least one structurally reinforcing metal insert be provided, at least in the area of the at least one cross member, in the area of at least one edge-side attachment profile, in the area of a transverse web, in the area of the at least one floor tray and/or in the area of the connecting structure for the chassis component. The metal insert(s) can here exhibit a geometry adjusted to the respective purpose and envisaged installation site, and in particular structurally reinforce the linking or attachment points provided on the floor module.

In order to screw the floor module with the adjacent body and/or chassis components, individual sleeves or metal threads are advantageously incorporated, which make it possible to screw or bolt corresponding connecting sites with the adjacent body components. It can further be provided that the floor module, in particular its cross member, but also the floor tray, be designed as a plastic reinforced with fiber or in some other way, in particular as a glass or carbon fiber-reinforced plastic, so that any transverse forces and moments acting on the cross members can be absorbed and, if necessary, diverted to adjacent body components, such as the rear frame rails. Possible plastic materials here include preferred thermoplastic elastomers, in particular those based on polypropylene (PP) or polyamide (PA), as well as duroplastics, in particular unsaturated polyester resins (UP). In addition, the floor module, in particular the area of its cross member, can incorporate structurally reinforcing ribs, which preferably can exhibit a parallel, perpendicular, crossed, lattice-like or hexagonal structure relative to the longitudinal and/or transverse direction of the cross member.

Another embodiment further provides that the floor tray of the rear floor module exhibits at least one depression for accommodating vehicle components and functional parts, as well as for accommodating a spare wheel and/or battery and/or at least one fuel container, for example an oil or liquid gas container. In particular, in hybrid or purely electric-powered vehicles, a depression designed for holding accumulators can be provided in the area of the floor tray. For example, the floor tray can be divided into two preferably coherent sections by the cross member located above the tray level. For example, the division can provide that one or more receptacles upstream from the cross beam in the traveling direction be furnished for one or more batteries or accumulators, and/or that the floor module incorporate a spare wheel well lying behind the at least one cross member.

The arrangement of the cross member along with its geometric configuration and dimensioning are preferably geared toward optimizing the available installation space. Depending on whether and to what extent the motor vehicle is to be provided with a spare wheel, accumulators, batteries and fuel tanks, or other functional components, such as a retractable load carrier in the rear area, the position of the cross member as viewed in the longitudinal direction of the vehicle can be adjusted by providing a rear floor module made of plastic individually tailored to the respective installation requirements. In this regard, a respective adjustment of the actual body and frame rails is no longer required.

Another embodiment provides a motor vehicle body that exhibits at least two side frame rails and at least one floor module arranged between the frame rails. The opposing end sections of a cross member extending between the frame rails and integrated into the floor module are arranged on the frame rails, and there separately connected with the respective frame rails. This floor module can exhibit all of the aforementioned characteristics and advantages.

A further embodiment also provides that the two frame rails exhibit several attachment points or attachment sites spaced apart from each other according to a predetermined grid in the longitudinal direction of the vehicle, which correspond with varying cross member positions of floor modules with different configurations. In this regard, a floor module tailored to the respective vehicle configuration can be provided with cross members varyingly positioned in the longitudinal direction of the vehicle, for example, and connected with the frame rails universally furnished with several attachment points, without separately adjusting the frame rails.

This makes it possible to make adjustments for the most varied of configurations of a vehicle type, which can be designed like a hybrid, with or without a rear luggage rack, a caravan or a limousine, by correspondingly selecting a floor module provided separately for the respective vehicle configurations, without having to introduce changes to the metal or sheet metal components of the body for this purpose, in particular to their rear frame rails. Therefore, the same type of frame rail can be used for the most varied of vehicle configurations. For example, if the vehicle is to be provided with a hybrid or electric motor drive concept, the specific position of the cross member and the module partitioning can be varied, in particular with respect to receiving depressions for emergency or spare wheels, as well as for batteries and/or fuel tanks, by selecting a respective floor module envisaged for the respective vehicle configuration. It is further conceivable for the floor module to exhibit not just one, but several cross members spaced apart from each other, e.g., in the longitudinal direction (x) of the vehicle, which each can be separately connected with the rear frame rails of the body.

Another embodiment further provides a motor vehicle, which exhibits at least one of the previously described rear floor modules and/or is provided with a previously described body.

BRIEF DESCRIPTION OF THE FIGURES

The present invention will hereinafter be described in conjunction with the following drawing figures, wherein like numerals denote like elements, and.

DETAILED DESCRIPTION

Figure 1:
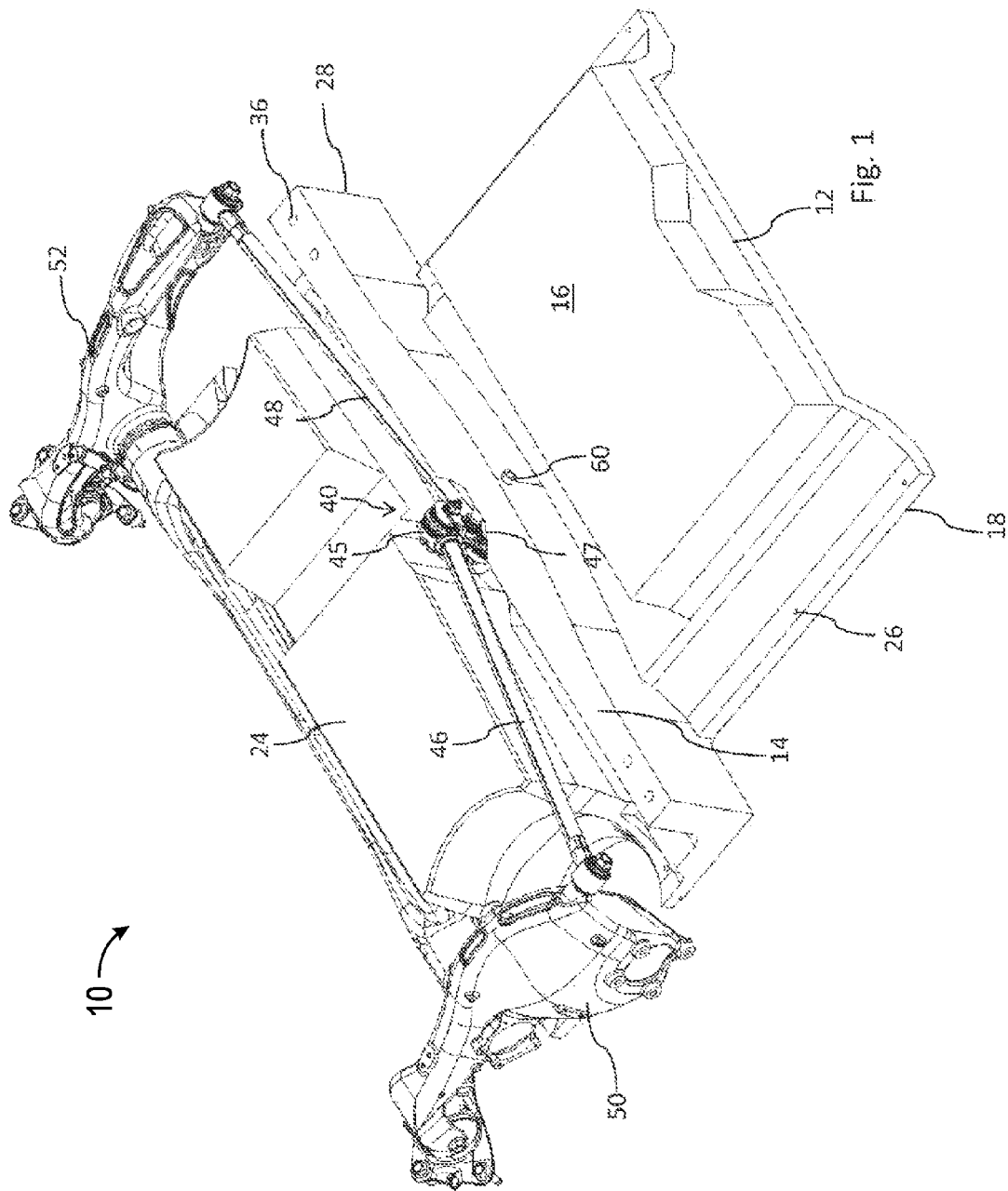
FIG. 1 is a perspective view of a floor module along with a Watt linkage attached thereto.

The following detailed description is merely exemplary in nature and is not intended to limit application and uses. Furthermore, there is no intention to be bound by any theory presented in the preceding background or summary or the following detailed description.

The rear floor module 10 depicted on FIG. 1, FIG. 2, FIG. 4, and FIG. 5 in various configurations and in perspective in different views exhibits a cross member 14 extending essentially in the transverse direction (y) of the vehicle, as well as a floor tray 12 designed as a single piece with the latter. In the embodiment shown, the floor tray 12 is designed as an approximately rectangular surface structure, which can be attached to the side frame rails 54, 56 of a motor vehicle body shown on FIG. 2 with the edge profiles 18 lying on the outside in the transverse direction (y) of the vehicle by means of passage openings 26 incorporated therein, which in turn are preferably furnished with metal inserts.

The floor module 10 is further designed to directly accommodate a chassis component, in the present case to attach a Watt linkage 46, 48. In this regard, it exhibits a connecting structure or attachment section 40, on which chassis components 46, 48 can be directly joined with the floor module 10. The Watt linkage 46, 48 running essentially in the transverse direction of the vehicle connects the two axle journals 50, 52 depicted on FIGS. 1 and 2, and is attached with a bolt 42 to the cross member 14 of the floor module 10 in the area of a bearing that comes to lie centrally between the frame rails 54, 56. In order to accommodate the Watt linkage 46, 48, in particular to mount the hinge 45 connecting the two rods 46, 48 with each other, a sleeve designed to accommodate the bearing bolt 42 is incorporated in the cross member 14 and, if necessary, also in the opposing cheek structure 44 of the receiving depression 24 or there embedded in the plastic component in the area of the cross member 14, as depicted on FIG. 3. In particular, the Watt linkage 46, 48 can be preconfigured and connected with or to the floor module 10 before any marriage of the body and chassis, so that the floor module 10 preassembled with the Watt linkage 46, 48 can be joined as a structural unit with the body or chassis even after the reciprocal assembly of body and chassis.

Figure 2:
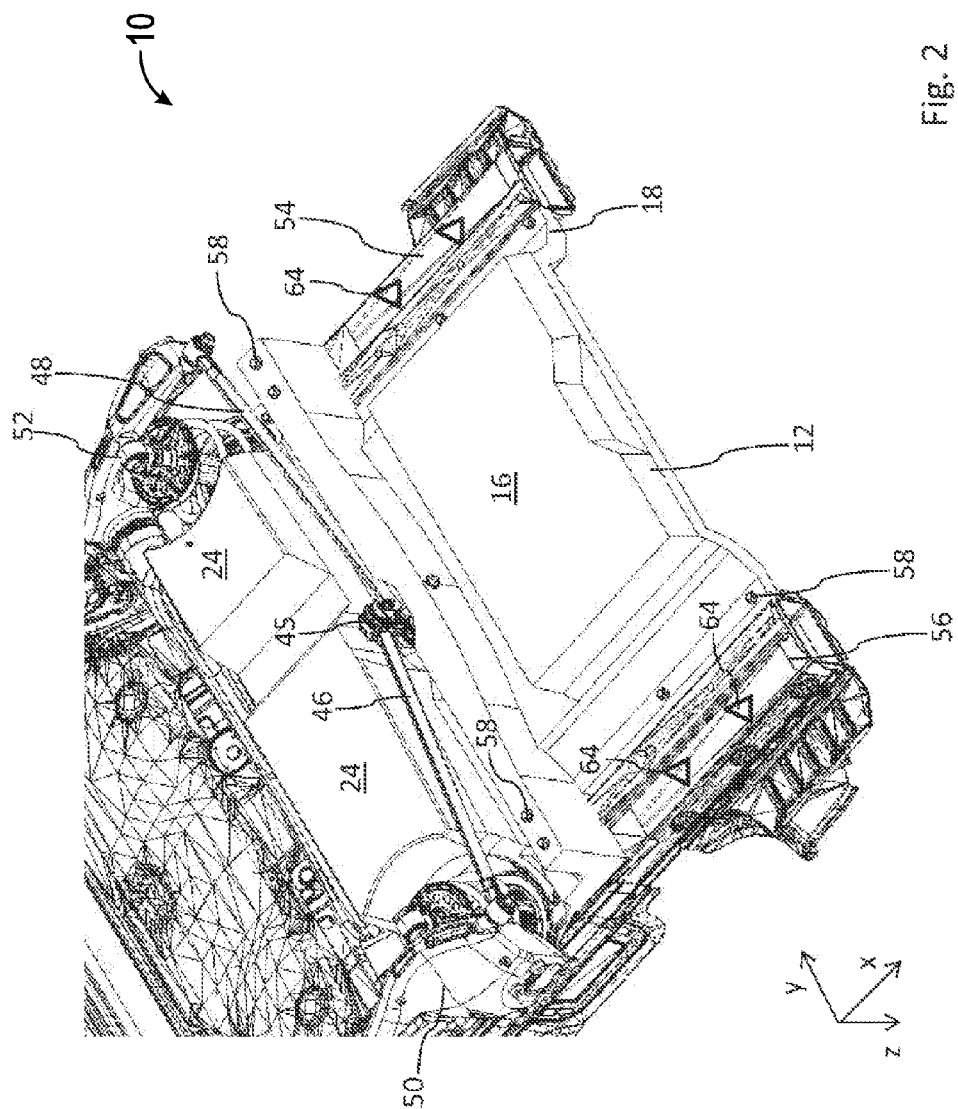
FIG. 2 is the view according to FIG. 1 in a possible installation situation on the body of a motor vehicle.
Figure 3:
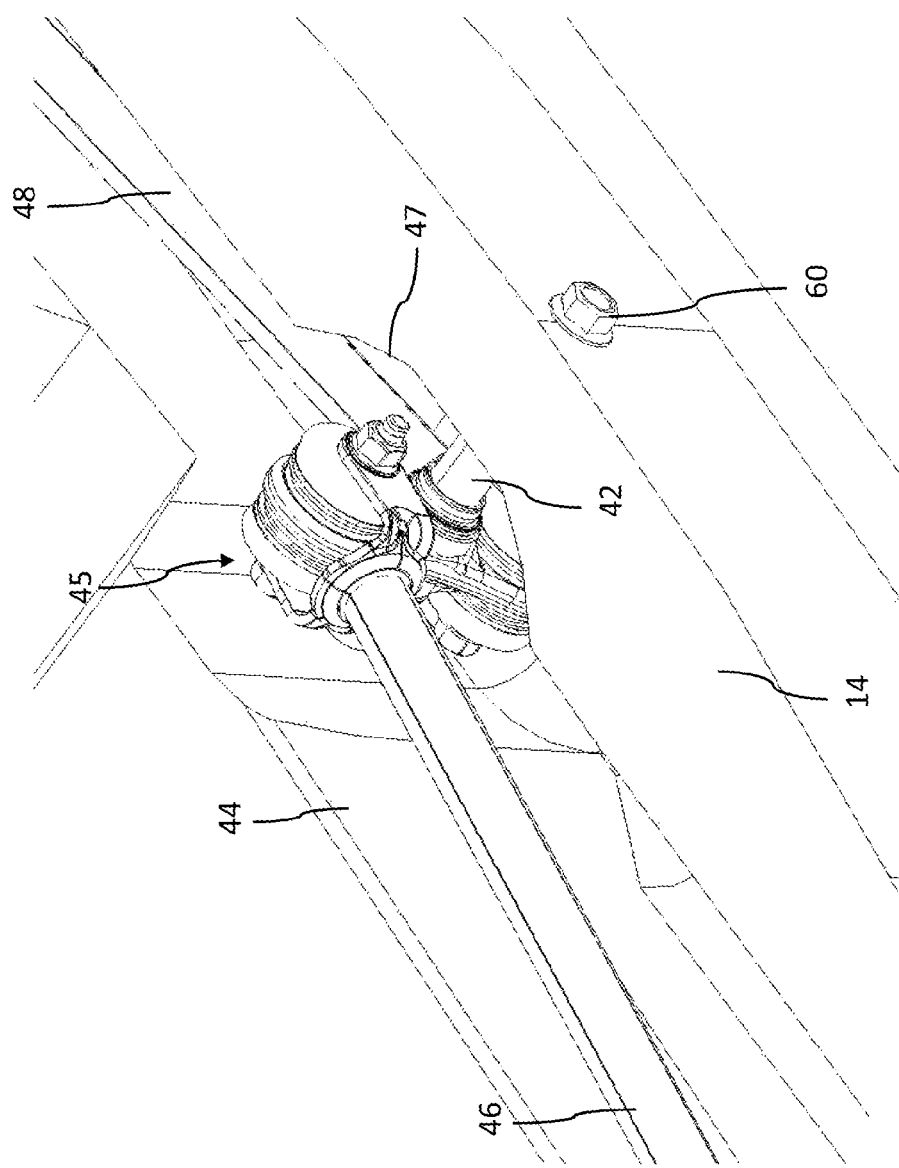
FIG. 3 is a detailed and magnified view of a Watt linkage mounted as denoted on FIG. 1.
Figure 4:
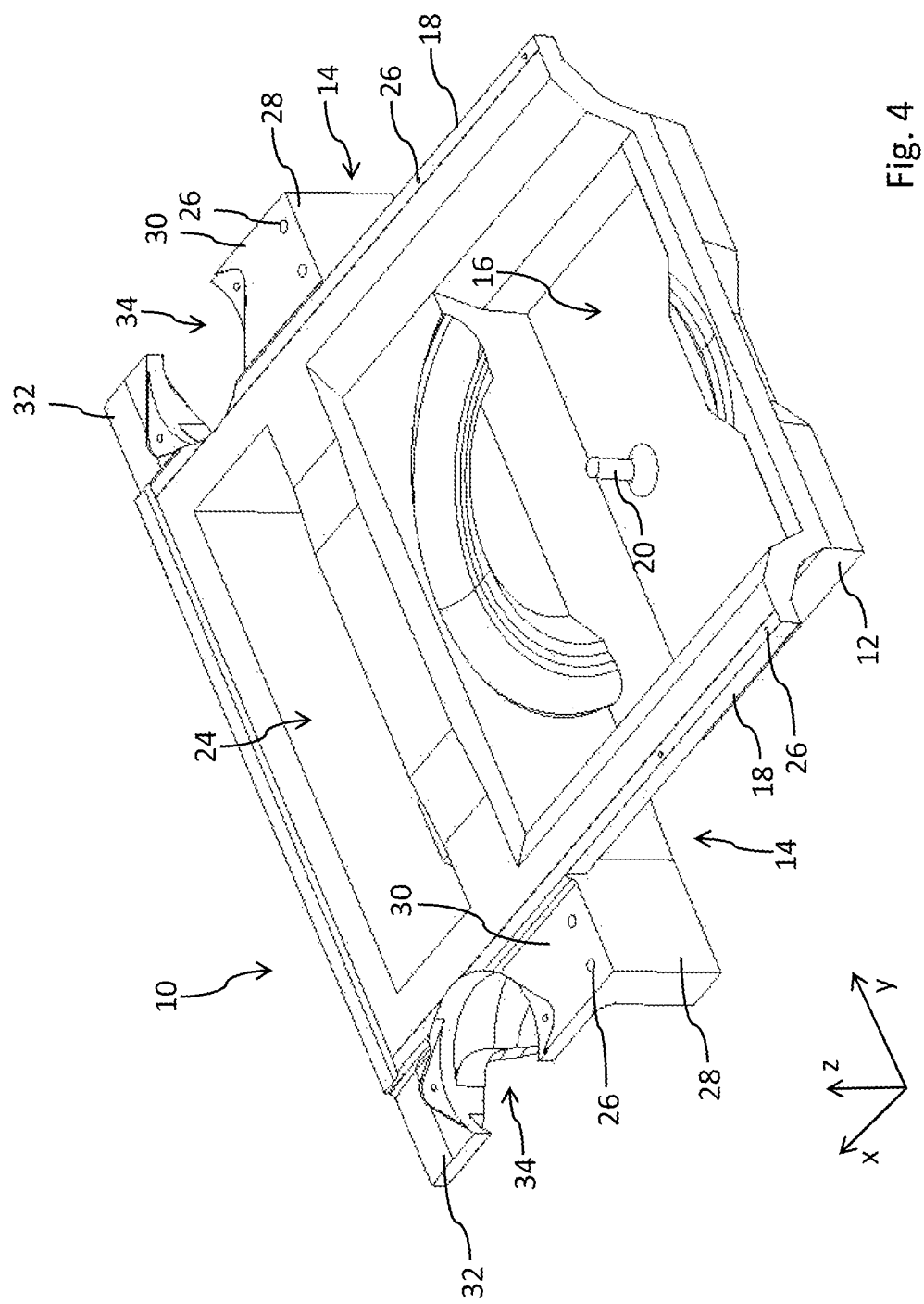
FIG. 4 is a perspective, isolated view of the floor module, viewed at an inclination from the back.
Figure 5:
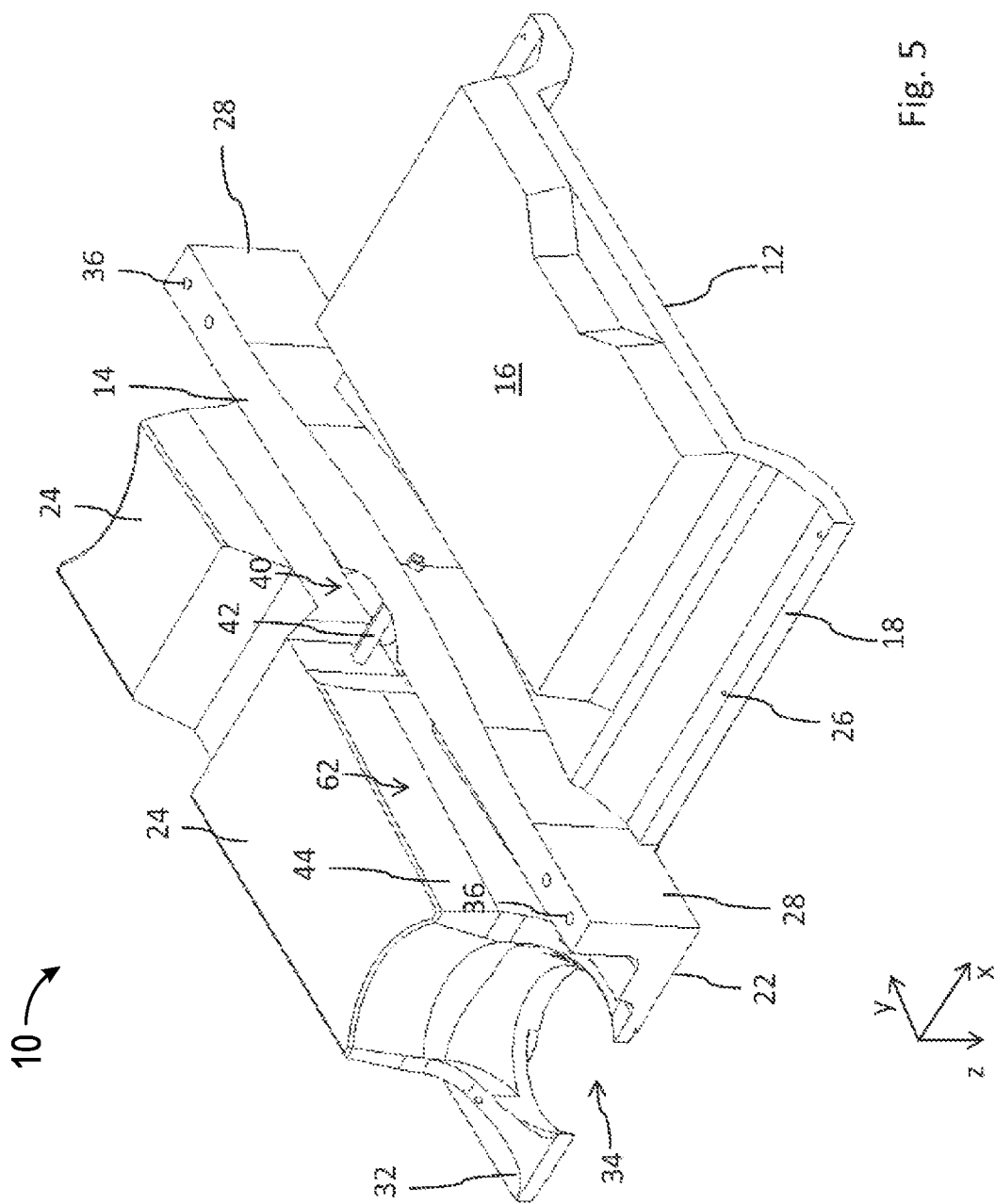
FIG. 5 is the floor module according to FIG. 4 viewed from the bottom.

In a magnified view, FIG. 6 further shows that the cross member 14 facing the Watt linkage 45 is provided with a concave indentation 47 that enables the collision-free assembly and mobility of the hinge 45 in the area of the floor module 10. FIG. 6 further shows how the Watt linkage 45 is bolted by means of a screw, bolt, or nut 60 extending essentially in the longitudinal direction (x) of the vehicle. Also denoted in the depiction according to FIGS. 2 and 4 are corresponding screws or bolts 58 that pass through passage openings 26. Since the body frame rails 54, 56 are preferably fabricated as sheet metal shells with the formation of lateral, outwardly or inwardly protruding flange sections, it is provided that the floor module edge profile 18 be bolted to the inside of the flange sections projecting on the frame rail 54, 56 for purposes of linking the edge profile 18 of the floor module 10.

The end sections 28 of the depicted cross member 14 lying in the transverse direction (y) of the vehicle exhibit a structure that laterally projects relative to the floor tray 12, which exhibits an essentially flat supporting surface 30 with individual attachment holes toward the top, facing a bottom side of the frame rails 54, 56. At a lower edge facing away from the supporting surface 30 and shown on FIG. 5, the cross member 14 exhibits clearance holes 36 allocated to the passage or attachment openings 26, which make it possible, for example, to bolt an upwardly projecting bolt 58 into the frame rail 54, 56 or its linking flange through a cross member 14 that is at least regionally hollow or configured with a hollow chamber profile. Provided toward the front in the traveling direction (x) adjacent to the supporting surface 30 of the cross member 14 is a roughly circular recess 34, which serves to accommodate a suspension strut. Another front, lateral flange section 32 extends the supporting surface 30 upstream from this recess 34, and just as the supporting surface 30, can be directly joined with the bottom side of an allocated frame rail 54, 56, preferably bolted thereto.

The rear section of the floor module 10 shown on FIG. 1, FIG. 2, FIG. 4, and FIG. 5 exhibits a depression 16 configured like a spare wheel well, in which an attachment dome 20 is provided for securing the spare wheel. At the front, the spare wheel well borders a transverse web 22 that roughly coincides with the position of the cross member 14 lying below in relation to the longitudinal direction (x) of the vehicle. Another receiving depression 24 resembling a pocket is situated in front of the transverse web 22, and can preferably be used to accommodate other functional components, such as one or more vehicle batteries, fuel tanks, or similar energy-storing modules.

The transverse web 22 can also extend somewhat more broadly in the longitudinal direction (x) of the vehicle than the cross member 14. In this way, a depression 62 that approximately passes through the floor module 10 in the transverse direction (y) of the vehicle can be formed on the bottom side of the floor module 10 shown on FIG. 1 between the cross member 14 and a side cheek 44 of the receiving depression 24 facing the cross member, and be provided for accommodating a Watt linkage 46, 48, as shown on FIG. 1, FIG. 2 and FIG. 3.

FIG. 2 schematically denotes individual attachment sites 64 in different positions in the longitudinal direction (x) of the vehicle, on which one or more cross members 14 of varyingly configured floor modules 10 can be arranged with respectively different cross member positions. In this way, the installation space can be adjusted to the respective vehicle-specific requirements just by using a floor module 10 tailored to a specific vehicle configuration, without having to adjust any other body components, such as the frame rails 54, 56. In addition, except for their respective cross member 14, the varyingly configured floor modules can be secured to the frame rails 54, 56 of the body in the same exact way, while always retaining a constant outer periphery. Nearly the entire floor module 10 is advantageously designed as an injection molded plastic part and/or hybrid component based on plastic, with locally provided metal inserts. In comparison to cross members 14 made out of steel or metal, this can help minimize the vehicle weight.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scopes set forth in the appended claims and their legal equivalents.

What is claimed is:

1. A preconfigured installation unit configured to be connected to frame rails of a vehicle body running essentially in a longitudinal direction of a vehicle during final assembly stages of the vehicle, the preconfigured installation unit comprising:
    a Watt linkage; and
    a rear floor module, comprising:
        a floor tray essentially extending flatly between the frame rails; and
        an integrated cross member configured for separate connecting with the frame rails configured to transmit mechanical forces when connected to the frame rails, wherein the integrated cross member and the floor tray are fabricated integrally as a one-piece injection molded plastic component, wherein the integrated cross member is configured to receive the Watt linkage, wherein the integrated cross member comprises: a connecting structure that is configured to couple the Watt linkage to the integrated cross member.

2. The rear floor module according to claim 1, wherein the floor tray comprises:
    a bottom side having a well;
    a transverse web disposed in front of the well; and
    a depression disposed in front of the transverse web.

3. The preconfigured installation unit according to claim 1, wherein the floor tray further comprises:
    a lateral bordering edge comprising an attachment profile adjusted to a geometry of an allocated frame rail that is configured to link to at least one frame of the frame rails.

4. The preconfigured installation unit according to claim 3, wherein the integrated cross member extends below the attachment profile of the floor tray in relation to a vertical direction of the vehicle.

5. The preconfigured installation unit according to claim 3, wherein the integrated cross member extends above the attachment profile of the floor tray in relation to a vertical direction of the vehicle.

6. The preconfigured installation unit according to claim 1, further comprising:
    a depression configured to accommodate the component on the bottom side of the rear floor module adjacent to the integrated cross member in the longitudinal direction of the vehicle.

7. The preconfigured installation unit according to claim 1, further comprising:
    a sleeve integrated with the integrated cross member that is configured to receive a bearing of the Watt linkage and aligned essentially in the longitudinal direction of the vehicle.

8. The preconfigured installation unit according to claim 7, further comprising:
    a receptacle that comes to lie flush with the sleeve is incorporated in a cheek adjacent to a depression in the longitudinal direction of the vehicle.

9. The preconfigured installation unit according to claim 1, wherein the integrated cross member comprises:
    end sections lying in a transverse direction of the vehicle that projects laterally from the floor tray, wherein the end sections comprise:
    a supporting surface provided with an attachment with which the integrated cross member is supported by the frame rails once reaching a final assembly position.

10. The preconfigured installation unit according to claim 1, wherein the transverse web extends between opposing attachment profiles on an edge side and is formed on a top side at a height of the integrated cross member in relation to the longitudinal direction of the vehicle.

11. The preconfigured installation unit according to claim 1, further comprising:
    a structurally reinforcing metal insert at least in an area of the integrated cross member in an area of at least one edge-side attachment profile.

12. A motor vehicle body of a vehicle, comprising:
    at least two rear side frame rails;
    a preconfigured installation unit connected to the at least two rear side frame rails, the preconfigured installation unit, comprising:
        a Watt linkage; and
        a rear floor module, comprising:
            a floor tray essentially extending flatly between the frame rails; and
            an integrated cross member with opposing end sections extending between the at least two rear side frame rails, wherein the integrated cross member and the floor tray are fabricated integrally as a one-piece injection molded plastic component, wherein the integrated cross member is configured to receive the Watt linkage, wherein the integrated cross member comprises: a connecting structure that is configured to couple the Watt linkage to the integrated cross member, and wherein the integrated cross member and the rear floor module are separately connected with the at least two rear side frame rails.

13. The motor vehicle body according to claim 12, wherein the at least two rear side frame rails comprise:
    a plurality of attachment points spaced apart from each other according to a predetermined grid in a longitudinal direction of the vehicle, which correspond with varying cross member positions of floor modules with respectively different configurations.

* * * * *